United States Patent [19]

McLaughlin

[11] Patent Number: 4,972,172

[45] Date of Patent: Nov. 20, 1990

[54] PORTABLE, BLINKING ALARM STATUS AND THEFT DETERRENT INDICATOR

[76] Inventor: Jack M. McLaughlin, 6108 S. Kings Rd., Los Angeles, Calif. 90056

[21] Appl. No.: 364,095

[22] Filed: Jun. 12, 1989

[51] Int. Cl.$^5$ ............................................. G08B 5/38
[52] U.S. Cl. ................................. 340/331; 340/425.5; 340/426; 307/10.8
[58] Field of Search ............... 340/426, 331, 321, 636, 340/425.5; 307/10.2, 10.8; 362/61, 95, 183

[56] References Cited

U.S. PATENT DOCUMENTS

| | | | |
|---|---|---|---|
| 2,987,702 | 6/1961 | Yohe | 340/331 |
| 3,411,036 | 11/1968 | Casey | 340/331 |
| 4,163,186 | 7/1979 | Haley | 340/636 X |
| 4,337,454 | 6/1982 | Iwata | 340/426 |
| 4,463,283 | 7/1984 | Penney et al. | 362/183 X |
| 4,750,094 | 6/1987 | Krasik | 362/95 |

Primary Examiner—Joseph A. Orsino
Assistant Examiner—Brian R. Tumm

[57] ABSTRACT

An electrical blinking light indicator device pluggable into an automotive cigarette lighter receptacle to generate a pulsing alarm signal for deterring unauthorized persons from entering or using the automobile. The indicator device includes a rechargeable battery for supplying electrical energy to a light-emitting diode in the absence of automotive electrical power at the cigarette lighter receptable. Circuitry within the device recharges the battery from the automotive power supply during normal vehicle operation.

1 Claim, 2 Drawing Sheets

PORTABLE, BLINKING ALARM STATUS AND THEFT DETERRENT INDICATOR

BACKGROUND—FIELD OF INVENTION

This invention relates to automobile theft and is used preferably in automobiles as a deterrent from theft or use by unauthorized person(s) and as an indicator or simulator of an alarm condition.

BACKGROUND—DESCRIPTION OF PRIOR ART

Many, if not most consumers have tried to protect their automobiles from theft or unauthorized use by different means. Specifically, installing an expensive alarm system is probably the most popular, especially the type which utilizes flashing L.E.D.'s (light emitting diodes).

Recent advancements in automotive alarm technology have caused a burgeoning of alarm "flashing" L.E.D.'s which are used in conjunction with the automobile alarm systems as visual indicators to warn probable thieves that the vehicle's alarm system has been activated. These "flashing" L.E.D.'s are an effective deterrent to auto theft.

Heretofore, these L.E.D.'s were physically wired into the vehicle as an alarm accessory. Numerous automobile alarm companies will, for an extra expense, install these L.E.D.'s on the vehicle's doors, dash, steering column, or anywhere the user requested. The majority of alarm installers will include L.E.D. installation as part of their alarm system installation costs. The problem with this is that: (1) It's too time consuming, (2) The L.E.D.'s are physically wired into the vehicle; (3) The L.E.D.'s are difficult to remove or replace because most installers don't use L.E.D. sockets. (Using sockets facilitates the easy removal of defective L.E.D.'s, or if the user wants to change the L.E.D. color or type, this can easily be accomplished by the use of sockets.)

Therefore, most consumers would prefer a portable blinking unit which is safe, durable, lightweight, reliable, inexpensive, and very easy to use. A unit that can be used as a theft deterrent with or without an alarm system incorporated into the vehicle.

OBJECTS AND ADVANTAGES

Accordingly, I claim the following as my objects and advantages of the invention: To provide a portable apparatus with means to flash a bright red L.E.D. when plugged into an automobile cigarette lighter receptacle; to provide such an apparatus that will utilize a rechargeable battery, (its own) that will also blink the L.E.D.; to provide such an apparatus that is easy to use, inexpensive, safe, durable, lightweight, reliable, and portable; to provide such an apparatus that requires a minimum of skill and training, if any, to use; to provide such an apparatus that would produce the desired results of a theft deterrent; to provide such an apparatus that will eliminate any electrical wiring that is now being used with "state of the art" alarm systems; to provide an apparatus which, if it malfunctions, can be repaired very easily; to provide an apparatus in which all of its components can be easily acquired; to provide an apparatus which can be used on most automobiles which use 12 volt negative ground electrical systems; to provide such an apparatus which can be used as a "decoy" to simulate an "alarm activated" condition.

DRAWING FIGURES

DRAWING REFERENCE NUMERALS

30 L.E.D.
32 clip for 30
34 upper body for 36
36 lower body for 34
38 electrode in 36
40 electrode in 34
42 mold inside 36 for 38
46 terminal for 50
48 terminal for 50
50 socket for 30
52 grommet for 68
54 spring for 38
56 clip holder for 64
58 circuit board
60 switch on 58
62 components on 58
64 battery
66 hole in 34
68 hole in 36
70 slots in 34
72 switch on 58
74 insulators on 40
76 hole in 42

INDICATOR—DESCRIPTION

Figure 1:
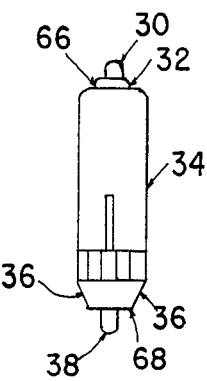
FIG. 1 shows a front elevational view of an indicator embodying my invention.
Figure 2:
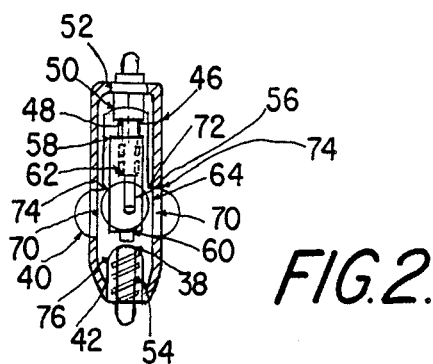
FIG. 2 shows a front sectional view of the FIG. 1 indicator with details of interior taken along the line 2—2 in FIG. 4.
Figure 3:
FIG. 3 shows a bottom view of the FIG. 1 indicator.
Figure 4:
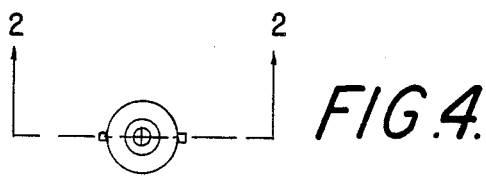
FIG. 4 shows a top view of the FIG. 1 indicator.

FIG. 1 shows a portable indicator according to the preferred embodiment of the invention. FIG. 2 shows a front sectional view of such indicator with details of the interior taken along the line of A—A of FIG. 4. A printed circuit board 58 is flat and rectangular in shape, (approximately $2''\times\frac{1}{2}''\times\frac{1}{8}''$), which has printed circuitry, electrical & mechanical components on the top and bottom sides. Rechargeable nickel-cadmium button battery 64 is installed on the top side of printed circuit board 58 and held in place by clip holder 56. Electrode 40, (metal), is partially exposed through the two (2) rectangular slots 70 of the upper body 34. Electrode 40 has insulators 74 fitted on its elbows, which are made of plastic shrink tubing. The two (2) legs of the electrode 40 extend to the plastic lower body 36 when lower body 36 and upper body 34 are mated. Upper body 34 and lower body 36 are threaded, male and female, respectively, and are made of molded plastic. Upper body 34 is cylindrical as well is lower body 36. Socket 50 is made of plastic and has two (2) terminals: terminal 46 and terminal 48, both of which extend onto the printed circuit board 58. The top of socket 50 fits into the hole 66, which has a diameter of about 0.30 in., by means of a plastic grommett 52.

A spring 54 which coils around an electrode 38, both of which are encased in a plastic mold 42 internal of the lower body 36. A hole 68 about 0.170 in. in diameter extends through the lower body 36 through the top of the mold 42. Electrode 38 extends 0.25 in. through hole 68 and about 0.005 in. through hole 76.

Clip 32, which is made of plastic and is cylindrical, holds the L.E.D. 30 in place when L.E.D. 30 is plugged into the hole 66 and socket 50.

INDICATOR—OPERATION

The indicator of FIG. 2, when plugged into an automobile cigarette lighter receptacle, will either blink the L.E.D. 30, recharge the battery 64 or do both. Also, the invention is capable of blinking without being plugged in, but it cannot recharge.

The indicator of FIG. 2 operates by utilizing two (2) sources of battery voltage: voltage that is normally present at the cigarette lighter receptacle of most automobiles; and its own rechargeable battery 64. The user simply plugs the indicator of FIG. 2 into the cigarette lighter receptacle with the electrode 38 going into the receptacle opening, and with the L.E.D. 30 facing outward.

The indicator is cylindrical because most, if not all, cigarette lighter receptacles are cylindrical. When sliding the indicator into the receptacle, the electrode 38 and electrode 40 will make electrical contact with the corresponding electrodes of the receptacle, electrode 38 and electrode 40 compressing as the indicator slides in. If there's a potential of +12 volts direct current present at the receptacle electrode with respect to ground, the L.E.D. 30 will blink at a rate of 0.5 hz. -3.0 hz per second. If there isn't a potential of +12 volts direct current present at the receptacle's electrodes, then the indicator's battery 64 will automatically switch into operation through diode switching and cause L.E.D. 30 to blink at the above rate, dependent upon switch 60 and switch 72 settings.

L.E.D. 30 is self-flashing type manufactured by many electronic companies. When a potential of +3.0 volts direct current, with respect to ground, is applied across the anode and cathode of L.E.D. 30, L.E.D. 30 will blink at the above mentioned rate. +3.0 volts direct current is typical operating voltage for this type of light emitting diode. L.E.D. 30 is fitted in hole 66 with a plastic clip 32 in order to hold the L.E.D. 30 snugly in place on top of upper body 34. Upper body 34 is used as an enclosure for the associated electrical and mechanical parts. Both upper body 34 and lower body 36 are made of molded plastic, have male and female threads and can be screwed and unscrewed. A variety of companies manufacture the upper body 34 and lower body 36 including the electrode 40 and electrode 38 as complete units. They are identified as "cigarette lighter adapters".

Grommett 52 is used primarily for cosmetic reasons. It gives the hole 66 and clip 32 a oneness. Socket 50 is used as an electrical extention cord for the L.E.D. 30 leads. Terminal 46 and terminal 48 are part of socket 50. These terminals are soldered to printed circuit board 58 which has the remaining electronics. (FIG. 5)

SCHEMATIC DESCRIPTION—CIRCUIT OPERATION

Figures 5, 6:
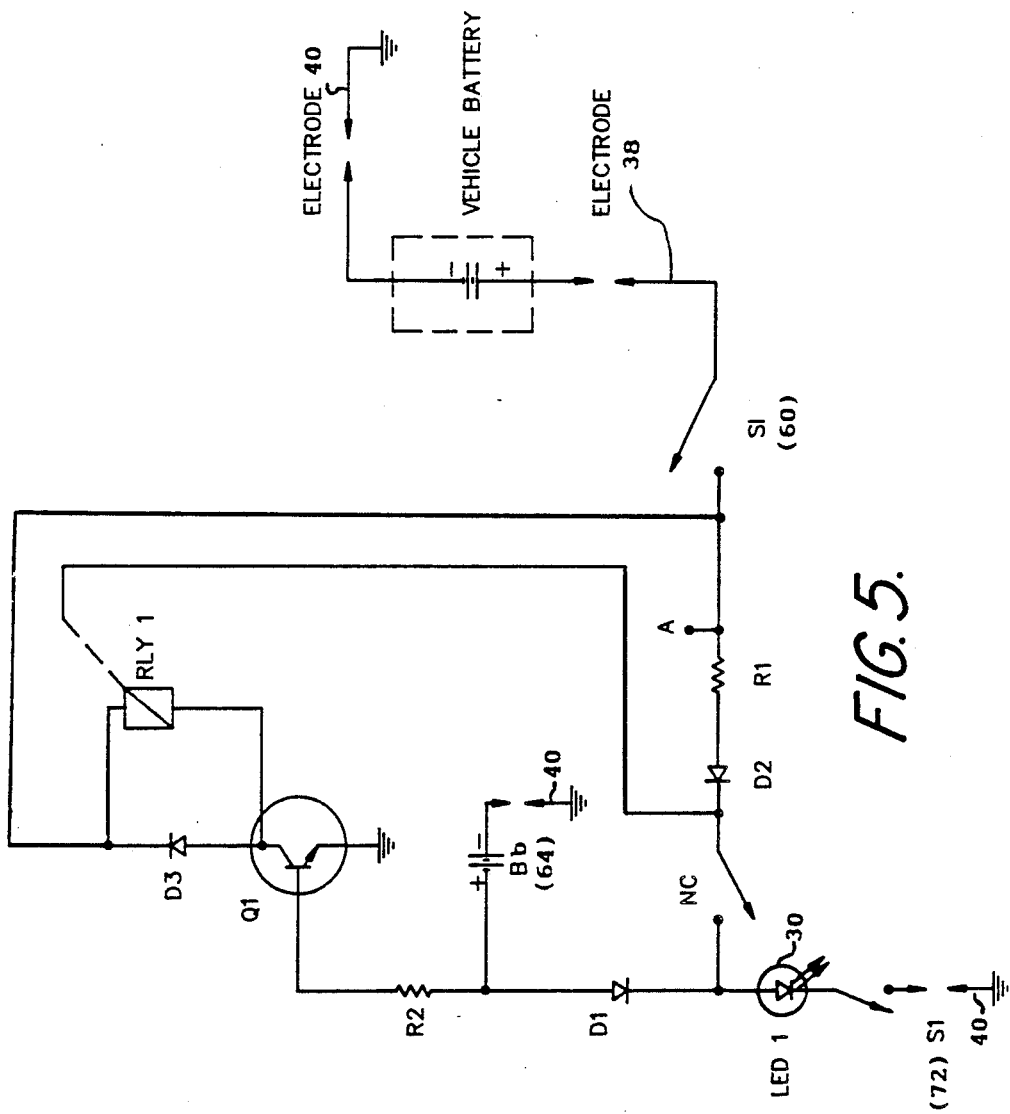
FIG. 5 is an electrical schematic diagram of a circuit used in the FIG. 1 indicator.
FIG. 6 is a Truth Table representation of the circuit in FIG. 5.

FIG. 5 is schematic representation of the electrical and mechanical operation of the indicator of FIG. 2. Diode D1 and Diode D2 are configured as a switching circuit with a B+ limiting fusible resistor R1, nickel cadmium battery Bb and Led1. S1 is a double throw, single pole printed circuit mount switch 72. SI is a two (2) element contact switch 60. Circuit operation follows: Four modes are possible with this circuit—mode 1: If switch S1 and SI are on (H), there will be a voltage drop across R1, assuming there is +12 volts direct current at point A. This voltage drop should be approximately 7 volts direct current therefore supplying about +5 volts direct current at the anode of D2 which has two (2) functions: 1. To supply at least +3.0 volts direct current for Led1 and, 2. To supply charging voltage/current for battery Bb. In this mode, the Led1 will blink at a rate of 0.05 hz-3.0 hz. Since the voltage across D2 cathode is more than the 3.0 volts across D1 cathode, D1 is switched off and D2 is switched on. A trickle voltage/current will flow through D1 to constantly charge Bb; mode 2: If S1 is (H) and SI is (L), the Led1 will blink, but charging voltage/current won't flow; mode 3: If S1 is (L) and SI is (H), only charging voltage/current will flow; mode 4: If S1 is (L) and SI is (L), neither lamp blinking nor voltage/current flow will occur. (Ref. FIG. 6 Truth Table). All of these functions are needed so that the indicator may be used in automobiles with different electrical voltages supplied at their cigarette lighter receptacles.

INDICATOR—OPERATION CONT'D

Battery 64 of FIG. 2 is replaceable and is easily removed and installed by unscrewing the lower body 36. Battery 64 can then be removed or installed by lifting battery clip 56, a positive contact made of copper. To prevent accidental short circuits during operation between the electrode 40 and battery 64, insulators 74 are used on the elbows of electrode 40. These insulators are plastic shrink tubing. Electrode 38 is spring loaded. The spring 54 and electrode 38 are both enclosed in a mold 42, which is plastic and is formed as part of the lower body 36 mold. Electrode 38 is the B+ terminal for the indicator and electrode 40 is the B− terminal. When the indicator is plugged into the receptacle of the automobile, electrode 38 will compress. At this point, electrode 38 is dependent upon automobile battery voltage being present at the corresponding receptacle terminals. If the particular automobile battery voltage is present at the receptacle without the ignition key turned on, B+ voltage will appear on electrode 38. Electrode 38 will cause switch 60 to close when the opposite end of electrode 38 pistons through the hole 76 of mold 42 and hole 68 after electrode 38 compresses. Switch 60, comprised of two (2) metal copper contacts in a normally open state, transfers B+ voltage to point A of FIG. 5. after switch 60 closes. This action combined with the subsequent compression of electrode 40 and activation of switch 72 will determine the operation mode of the indicator.

The rechargeable battery 64 is used because many automobile electrical systems are such that their cigarette lighter receptacles will only supply B+ voltage at the receptacle when the ignition switch is turned on. Obviously, the user isn't going to leave his/her automobile unattended with the ignition key on in order to activate the indicator to protect the vehicle. Therefore, as a ramification, I needed a rechargeable battery 64 that could be automatically switched into operation for this particular type of vehicle. So, dependent upon switch 60 and switch 72 settings, the battery 64 will be switched in by D1 of FIG. 5 (if no voltage is present at the receptacle) and L.E.D. 30 will blink. Overcharging of battery 64 is prevented by the activation of RLY1 through Q1 with D3 used as a reverse clamping diode because of the inductive load of RLY1. Thus, the reader will see that the invention provides a portable, lightweight, attractive, durable, reliable, safe, and inexpensive low cost thief deterrent for their automobiles.

While my above description contains many specificities, these should not be construed as limitations on the scope of the invention, but rather an exemplification of one preferred embodiment thereof. For example, skilled artisans will readily be able to change the dimensions and shapes of the various embodiments. They will be able to make the indicator of an alternate material, such as wood. They can make it in different colors to match the vehicles interior. L.E.D. 30 of FIG. 2 can also be of a different color or make. The upper body 34 of FIG. 2 can be structurally modified to accommodate two (2) or more blinking light emitting diodes in a variety of configurations. In fact, the user can modify it to accommodate an incandescent lamp for reading or a map lamp and blinker combined into one unit. Accordingly, the reader is requested to determine the scope of the invention by the appended claims and their legal equivalents, and not by the examples which have been given.

I claim:

1. A blinking light indicator comprising a dielectric housing adapted for insertion into an automotive cigarette lighter receptacle; said housing having an elongated annular side surface terminating in first and second housing ends; a first spring-biased plunger electrode (38) extending through said first end of the housing for electrical contact with a positively charged component in a cigarette lighter receptacle; a second deflectable electrode (40) projecting through said annular side surface of the housing for electrical contact with a negatively grounded component in a cigarette lighter receptacle; a rechargeable battery (64) physically located within said housing, said rechargeable battery having a positive terminal; said rechargeable battery having a negative terminal connected to said deflectable electrode (40); a light-emitting diode (30) having a positive terminal; said light-emitting diode having a negative terminal connected to said deflectable electrode; said light-emitting diode being physically located in said second end of the housing so that its light output is directed externally of the housing; said light-emitting diode being constructed so that it has a pulsed blinking light output; a rectifier diode (D1) and a resistor (R1) mounted within said housing; said resistor being electrically connected between said plunger electrode and the positive terminal of the light-emitting diode; said rectifier diode (D1) having a first terminal connected to the positive terminal of the rechargeable battery, and a second terminal connected to the positive terminal of the light-emitting diode and to said resistor (R1); said rectifier diode (D1) being fully conductive in the direction from said rechargeable battery to the light-emitting diode and weakly conductive in the direction from said resistor (R1) to the rechargeable battery; said rectifier diode being operable to deliver recharging current to the rechargeable battery when the light-emitting diode is being energized through the resistor; said rectifier diode being operable to deliver current from the rechargeable battery to the light-emitting diode in the absence of current flow through said plunger electrode and said resistor.

* * * * *